United States Patent [19]
Johnson

[11] 3,844,046
[45] Oct. 29, 1974

[54] STUD FOR A MOVABLE GAGING ELEMENT AND ITS COMBINATION WITH THE GAGING ELEMENT AND WITH A GAGE

[75] Inventor: Stanley G. Johnson, West Hartford, Conn.

[73] Assignee: The Johnson Gage Company, Bloomfield, Conn.

[22] Filed: Oct. 24, 1973

[21] Appl. No.: 409,089

[52] U.S. Cl............ 33/147 M, 33/199 R, 248/288, 248/295, 248/298, 403/52
[51] Int. Cl. ........................................... G01b 5/08
[58] Field of Search.......... 33/199 R, 147 R, 172 R, 33/180 R, 199 B, 143 R, 147 M, 179.5 B; 248/295, 298, 288; 403/52; 308/2 R, 189

[56] References Cited
UNITED STATES PATENTS
2,940,175  6/1960  Johnson ........................... 33/199 R
3,353,277  11/1967  Johnson ........................... 33/147 M Primary Examiner—Louis R. Prince
Assistant Examiner—Willis Little
Attorney, Agent, or Firm—John M. Montstream

[57] ABSTRACT

A gage includes a gaging element mounted for movement on a gaging axis diametrically of the test part and a relatively fixed cooperating gaging means. The position of the movable gaging element with a test part in the gage is indicated by an indicator and measures or compares the diameter of the test part with a master part. The stud to be described is constructed with an outer member having a bore which receives an inner member. The inner member is anchored to a gage frame. The outer member has pin means of one or more pins secured thereto which pin is slidable in a hole in the inner member with a range of movement of the inner member with respect to the outer member at least a little more than the tolerance limit of the test part. With the stud herein there can be no cocking of the gaging element and hence a more accurate reading is secured. The invention also includes the combination of the stud with a gaging element and also with a gage having a movable gaging element mounted on the stud and a cooperating gaging means.

7 Claims, 3 Drawing Figures

PATENTED OCT 29 1974 3,844,046

STUD FOR A MOVABLE GAGING ELEMENT AND ITS COMBINATION WITH THE GAGING ELEMENT AND WITH A GAGE

A gage, and particularly a screw thread gage has a movable gaging element and a cooperating gaging means spaced therefrom so that a test part to be gaged is received between the gaging element and the cooperating means. The gaging element and the cooperating gaging means may be of the roll type or segment type. The gaging element is mounted for movement on the gaging axis so that this element takes a position dependent upon the diameter of the test part. An indicator is responsive to the position of the movable element and indicates whether or not the test part is within allowable tolerances. Movement of the movable element has been accomplished here-to-fore, such as by providing a slot in the gaging element which slot receives the stud. In this construction some cocking of the gaging element on the stud is possible. The stud to be described is constructed so that the movable gaging element cannot cock and thus assures that an accurate measurement of the test part is secured.

An object of the invention is to construct a stud for a gaging element which provides movement for the gaging element of at least a little more than the tolerance limit of the test part in order to actuate an indicator and which cannot cock.

Another object is to construct a combination of the above stud with a gaging element.

A still further object is to construct a gage having spaced gaging means including a gaging element which is mounted on the stud so that it is movable on the gaging axis and will not cock.

Other objects of the invention will be more apparent from the following description when taken in connection with the accompanying drawing illustrating a preferred embodiment of the invention in which.

Figure 3:
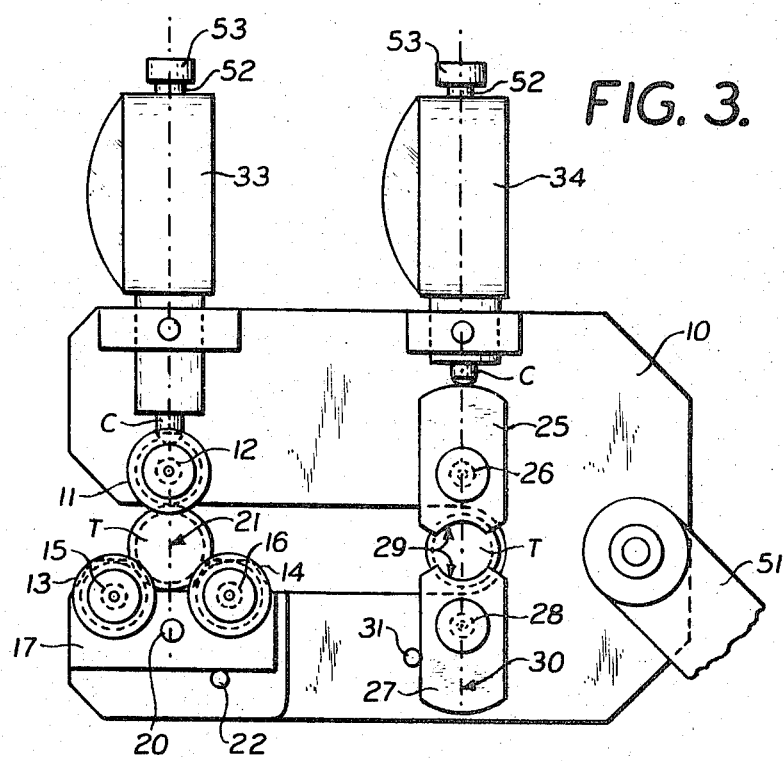
FIG. 3 is a side view of two gages with the upper gaging element of each gage mounted on the stud herein.

A gage construction is shown in FIG. 3 with two gages which use the stud herein to mount the movable or upper gaging element of each gage. The gage construction includes a frame 10 carrying the two gages each gage having a pair of spaced gaging means. One gage is of the roll type which includes a single movable engaging element or roll 11 rotatably mounted on a stud 12. The cooperating gaging means is a pair of spaced gaging rolls 13 and 14 each rotatably mounted on its respective stud 15 and 16, which studs mount the gaging rolls without radial movement. The studs and their rolls 15 and 16 are mounted on a pivotal frame 17. This frame is mounted on a pivot pin 20 which permits the pivotal frame to pivot to open position so that the test part T can be placed on the pair of gaging rolls and pivoted to gaging position or to the gaging axis 21 in which position the test part is in contact with the movable gaging element or roll 11. A stop 22 limits pivoting of the frame 19 to gaging position. Although the gaging rolls pivot with the pivotal frame they are fixed in position so far as movement along the gaging axis is concerned. The gaging rolls are preferably mounted on their studs for rotation although they could be fixed thereon.

The gaging means for the other gage is of the segmental type and includes a movable gaging element 25 mounted on a stud 26 for pivotal and radial movement thereon. The other gaging segment 27 is pivotally mounted on a fixed stud 28. Each of the segments has a concave gaging surface 29. The segmental gaging elements are pivoted to open position and the test part T is inserted laterally into the concave gaging surfaces and in so doing pivots the segments to gaging position on the axis 30. A stop 31 limits pivotal movement of gaging means 27 to gaging position in alignment with the gaging axis 30 and the test part retains the segment 25 on the gaging axis.

The studs 12 and 26, FIG. 3 are constructed to allow movement of its gaging element 11 and 25 radially along its respective gaging axis 21 and 30 so that the gaging element assumes a position depending upon the diameter of the test part T between the gaging elements or means. An indicator 33 for the tri-point or tri-roll gage and an indicator 34 for the segmental gage indicates whether or not the test part is within allowable tolerances.

Figure 2:
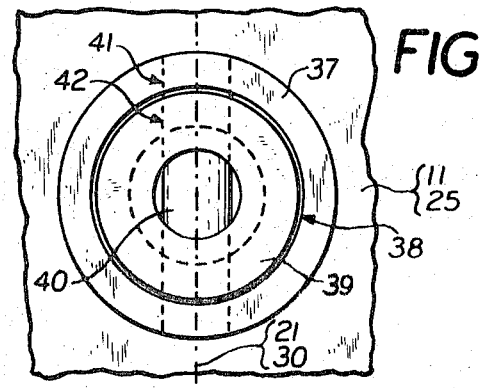
FIG. 2 is an end view of the stud taken on line 2—2 of FIG. 1 with a retaining screw removed.
Figure 1:
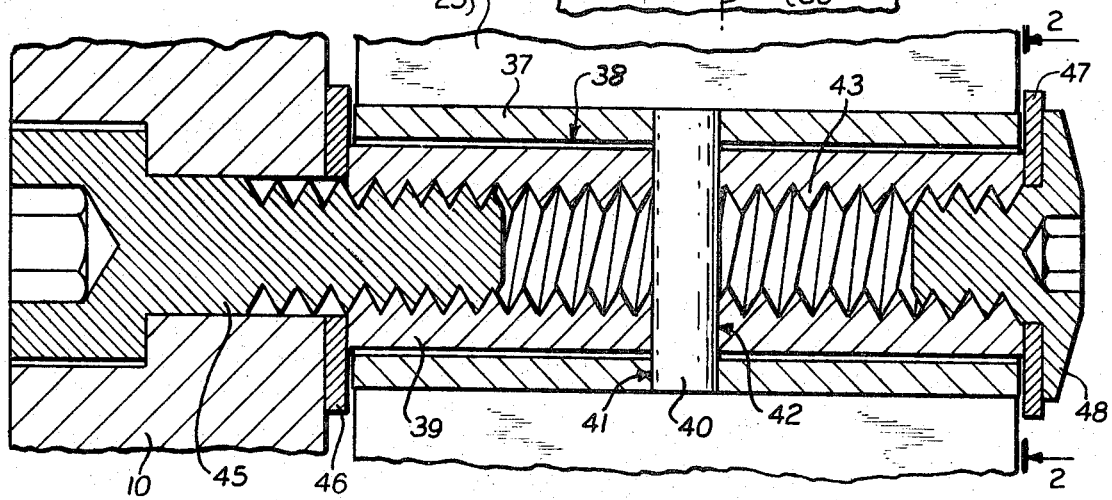
FIG. 1 is a longitudinal sectional view through the stud.

The stud, FIGS. 1 and 2, which mounts each movable gaging element includes an outer member 37 which has a bore 38 extending longitudinally therethrough. An inner member 39 is smaller in diameter than the bore and is received therein. Pin means, shown as a single pin 40, is secured to the outer member, such as with a drive fit, in a hole 41 and psses through a bearing or hole 42 in the inner member which slidably receives the pin without any or no appreciable cocking. The outer member is slightly shorter in length than the inner member such as secured by a mere brushing of the ends with a grinding wheel. The pin means may be one pin for a short stud or two or more pins parallel to each other for a long stud. A stud of the length of FIG. 1 perhaps would desirably have two pins. The inner member has a threaded hole 43 at least at each end thereof.

The stud for each of the movable gaging elements is secured to the gage frame by a screw 45 received in the threaded hole 43 in the inner member which draws the end of the inner member tightly against the frame 10, or against a spacing washer 46. The gaging element is slipped on the outer member. A washer 47 may be used in contact with the outer end of the stud and a retaining screw 48 is threaded into the threaded hole 43 in the inner member to retain the gaging element on the stud. The pin means 40 of the stud is in alignment with the respective gaging axis 21 and 30 so that the gaging element has movement in this direction. With the outer member being slightly shorter than the inner member, the former with its gaging element has freedom of movement on the pin means with respect to the cooperating gaging means along the gaging axis. The relative diameter of the bore 38 and the inner member 39 is such that the outer member and its gaging element has movement along the gaging axis solely and at least a little greater than the tolerance limit of the test part.

The contact C for the indicator 33 engages a cylindrical portion of the gaging roll 11 and the contact for the indicator 34 engages a surface on the segment 25, such as the end thereof, in known manner. The gage frame 10 may be adjustably carried on a base plate plate having a pedestal 51.

The spring within each indicator pressing the contactor C downwardly will press the movable gaging element against the test part. If it should be deemed desirable to increase the spring pressure an additional spring may be added in any suitable way. A simple and convenient way to increase the spring pressure is to insert a coil spring within the indicator projection 52 by removing the cap 53 and insert the spring, the end of which engages the upper end of the contactor and then re-thread the cap on the projection to back up the spring.

The gaging elements particularly shown are for gaging screw threads with the rolls 12, 13 and 14 having a screw thread engaging ridge or ridges forming its gaging surface. The segmental gaging elements have a portion of an internal thread in their concave gaging surfaces 29.

The cooperating gaging means 13 and 14 as well as 27 may be fixed in position in which event a screw threaded test part must be threaded into the gaging means. With the gaging rolls 13 and 14 mounted on the pivoted frame 17 and the segments 25 and 27 being pivotally mounted, the test thread can be inserted into the gages axially for faster insertion and removal of the test part from the gages.

It is not necessary that the outer member of the stud be shorter than the inner member in order to provide clearance which gives the outer member freedom of movement without interference from the stud mounting means and the retaining screw 48 or the washers 46 and 47. The inner and outer members of the stud may be the same length and the necessary clearance can be provided in the washers with a slight bosss or a shim so that the inner member only is clamped to the gage frame and the inner member only is engaged by the retaining screw or washer 47.

This invention fills a need for improvements in a Stud for a Movable Gaging Element and its combination with the Gaging Element and with a Gage. Various modifications in structure, as well as changes in the mode of operation, assembly, and manner of use often occurs to those skilled in the art, especially after benefitting from the teachings herein. This disclosure illustrates the preferred means of embodying the invention in useful form

What is claimed is:

1. A stud for mounting a gaging element on a gage frame for limited radial movement to gage a test part comprising an inner member, an outer cylindrical member having a bore therethrough receiving the inner member, pin means secured to the outer member between the ends thereof and extending diametrically including at least one pin, the bore having a dimension to allow relative movement of the outer member with respect to the inner member greater than the tolerance limit of the test part, the central axis of the stud being the central axis of the inner member, the inner member having a hole for each pin in which the pin is slidable for movement of the outer member relatively to the inner member, and means carried by the inner member to be used to secure the same to a gage frame.

2. A stud as in claim 1 in which the outer member is slightly shorter in length than the inner member.

3. A combination of the gaging element and the stud of claim 1 including a gaging element having a mounting hole receiving the outer member for rotation or pivoting, and a gaging surface carried by the gaging element.

4. A gage combination with the stud of claim 1 including a gage frame, means engaging the inner member of the stud and mounting the stud on the gage frame, a gaging element mounted on the stud, cooperating gaging means, means mounting the cooperating gaging means on the gage frame spaced from the gaging element, the gaging element and the cooperating gaging means having a gaging axis passing through the center of the stud for the gaging element, parts including the stud mounting means and the outer member of the stud, one of said parts providing clearance for freedom of movement of the outer member relative to the inner member, and the pin means being in alignment with the gaging axis.

5. A gage combination as in claim 4 in which the outer member of the stud is shorter than the inner member to provide the clearance.

6. A gage combination as in claim 4 in which the gaging element is a gaging roll, the cooperating gaging means including a pivoted frame mounted on the gage frame, a pair of spaced gaging rolls mounted on the pivoted frame, and a stop means limiting pivotal movement of the pivoted frame to gaging position for the gaging rolls with respect to the gaging axis.

7. A gage combination as in claim 4 in which the gaging element is a gaging segment having a concave gaging surface and pivotally mounted on the stud, the cooperating gaging means being a gaging segment with a concave gaging surface and pivotally mounted on its mounting means, and stop means for the cooperating gaging segment limiting pivotal movement thereof to gaging position on the gaging axis.

* * * * *